United States Patent
Yamagishi

(10) Patent No.: US 8,757,705 B2
(45) Date of Patent: Jun. 24, 2014

(54) STRUCTURE FOR FRONT SECTION OF VEHICLE BODY

(75) Inventor: Hideaki Yamagishi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 18 days.

(21) Appl. No.: 13/499,815

(22) PCT Filed: Aug. 27, 2010

(86) PCT No.: PCT/JP2010/064599
§ 371 (c)(1),
(2), (4) Date: Apr. 2, 2012

(87) PCT Pub. No.: WO2011/043135
PCT Pub. Date: Apr. 14, 2011

(65) Prior Publication Data
US 2012/0200120 A1    Aug. 9, 2012

(30) Foreign Application Priority Data
Oct. 9, 2009   (JP) .................................. 2009-235499

(51) Int. Cl.
*B62D 25/14*   (2006.01)
(52) U.S. Cl.
USPC .......................................... 296/192; 180/90
(58) Field of Classification Search
USPC ............ 296/193.06, 193.09, 193.11, 70, 192, 296/203.02, 203.03, 203.01, 198, 187.09; 180/90
See application file for complete search history.

(56) References Cited

U.S. PATENT DOCUMENTS

| | | | | |
|---|---|---|---|---|
| 4,270,793 A * | 6/1981 | Harasaki et al. | | 296/192 |
| 4,886,314 A * | 12/1989 | Maeda | | 296/192 |
| 5,042,872 A * | 8/1991 | Yoshii | | 296/203.02 |
| 5,052,742 A * | 10/1991 | Akoshima et al. | | 296/192 |
| 7,296,824 B2 * | 11/2007 | Yasui et al. | | 280/784 |
| 2008/0296934 A1* | 12/2008 | Shishido | | 296/203.02 |
| 2009/0066116 A1* | 3/2009 | Kuroita et al. | | 296/193.09 |
| 2009/0146459 A1* | 6/2009 | Watanabe et al. | | 296/192 |

FOREIGN PATENT DOCUMENTS

| | | | | |
|---|---|---|---|---|
| JP | 04-254264 | 9/1992 | | |
| JP | 04254264 A * | 9/1992 | ............ | B62D 25/08 |
| JP | 10-203413 | 8/1998 | | |
| JP | 2005-153800 | 6/2005 | | |
| JP | 2006-213291 | 8/2006 | | |
| JP | 2008-296833 | 12/2008 | | |
| JP | 2009-067113 | 4/2009 | | |

* cited by examiner

*Primary Examiner* — Jason S Morrow
*Assistant Examiner* — E Turner Hicks
(74) *Attorney, Agent, or Firm* — Rankin, Hill & Clark LLP

(57) ABSTRACT

A structure for the front section of a vehicle body, allowing a collision load to be efficiently transmitted from upper members to front pillars. A structure (20) for the front section of a vehicle body has L-shaped cross-sectioned frames (32) which bridge upper members (26) and front pillars (23). The L-shaped frames (32) are each connected to a front pillar (23) and an upper member (26) in such a manner that the upper surface of the L-shaped frame (32), the upper surface (26a) of the upper member (26), and the upper surface (23a) of the front pillar (23) from a continuous flat surface and that the outer side surface of the L-shaped frame (32), the outer side surface (26b) of the upper member (26), and the outer side surface (23b) of the front pillar (23) form a continuous flat surface.

3 Claims, 6 Drawing Sheets

STRUCTURE FOR FRONT SECTION OF VEHICLE BODY

TECHNICAL FIELD

The present invention relates to a vehicle having a curved windshield and a hood having a leading end located at a lower level, and in particularly to a vehicle body front structure including a dashboard upper member and its surroundings.

BACKGROUND ART

A known vehicle body front structure includes a dashboard lower member and a dashboard upper member which separate a passenger compartment and an engine compartment. This type of vehicle body front structure is designed taking account of characteristics of a vehicle body design to provide satisfactory rigidity. Such a structure has a dashboard upper side member extending over a dashboard upper member (see, e.g., Patent Literature 1 below).

In a vehicle body front structure disclosed in Patent Literature 1, a passenger compartment is separated from an engine compartment by a dashboard upper member. Disposed on a side of the dashboard upper member is a front pillar. Upper members extend from the front pillars and define drainage channels. A dashboard upper side member extends over the drainage channels of the upper member.

When the upper member is subjected to a load from the front side of the vehicle body, the dashboard upper side member cannot sufficiently transmit such a load to the front pillar because the dashboard upper side member does not interconnect the upper member and the front pillar.

In general, a dashboard upper member has opposing end portions providing a complicated structure because a hood hinge, a wiper and components increasing rigidity of a vehicle body are disposed on the end portions of the dashboard upper member. For example, a hinge base to which is attached the hood hinge is provided separately from a side member increasing strength of the vehicle body. In this case, no component other than the side member is connected to the front pillar. In other words, since the hinge base is separate from the side member, a collision load transmitted from a front face of a vehicle to the upper member can be transmitted to the front pillar through the side member alone. As a result, the collision load cannot efficiently be transmitted from the upper members to the front pillars.

PRIOR ART LITERATURE

Patent Literature

Patent Literature 1: Publication of Japanese Patent No. 4272173

SUMMARY OF THE INVENTION

Problems to be Solved by the Invention

An object of the present invention is to provide a vehicle body front structure capable of efficiently transmitting a collision load from upper members to front pillars and capable of transmitting a load from a front side frame to the front pillars.

Means to Solve the Problems

According to one aspect of the present invention, there is provided a vehicle body front structure comprising: a dashboard lower member and a dashboard upper member separating an engine compartment and a passenger compartment; front pillars disposed at left and right ends of the dashboard lower member and the dashboard upper member; upper members extending from the front pillars toward a front side of a vehicle body; and a windshield support disposed on an upper portion of the dashboard upper member, wherein L-shaped cross-sectional frames extend from the upper members to the front pillars, and the L-shaped cross-sectional frames interconnect the front pillars and the upper members, wherein the L-shaped cross-sectional frames include upper surfaces and outer surfaces, the upper members include upper surfaces and outer surfaces, and the front pillars include upper surfaces and outer surfaces, and wherein the upper surfaces of the L-shaped cross-sectional frames, the upper surfaces of the upper members and the upper surfaces of the front pillars define continuous flat surfaces, and the outer surfaces of the L-shaped cross-sectional frames, the outer surfaces of the upper members and the outer surfaces of the front pillars define continuous flat surfaces.

Preferably, the dashboard upper member and the windshield support have respective rear end flanges coupled together with an air passage defined forward of the rear end flanges of the dashboard upper member and the windshield support, the dashboard lower member includes an upper end flange having a center coupled to the rear end flanges of the dashboard upper member and the windshield support and left and right side portions coupled to a bottom surface of the dashboard upper member, and the dashboard lower member is flat between left and right sides thereof.

Preferably, the L-shaped cross-sectional frames are coupled to damper bases having upper portions supported by the dashboard upper member.

Preferably, the dashboard upper member has opposing ends defining drainage channels for draining rainwater.

Preferably, the windshield support supports a windshield separating the passenger compartment and the outside of a vehicle, and the windshield has curved left and right side portions extending rearward from a front side of the dashboard lower member.

Advantageous Results

The present invention provides the following effects.

According to the present invention, since the L-shaped cross-sectional frames extend from the upper members to the front pillars and the L-shaped cross-sectional frames joint the upper surfaces of the upper members and the upper surfaces of the front pillars with the continuous flat surfaces and joint the outer surfaces of the upper members and the outer surfaces of the front pillars with the continuous flat surfaces, a collision load in case of head-on collision of the vehicle can efficiently be transmitted from the upper members to the front pillars. As a result, the vehicle body rigidity can be improved.

Preferably, according to the present invention, since the dashboard upper member and the windshield support have the respective rear end flanges coupled to define an air passage on the front side, and the dashboard lower member has the upper end flange coupled at the center to both of the rear end flanges and coupled on the left and right side portions to the bottom surface of the dashboard upper member, and is flat between the left and right sides, the vehicle rigidity can sufficiently be ensured and, for example, when the significantly curved windshield is employed, the windshield can be disposed without narrowing a passenger compartment space.

According to the present invention, the L-shaped cross-sectional frames are coupled to the damper bases supported at the upper portions by the dashboard upper member and, therefore, for example, a load from a front side frame supporting the damper bases can also be transmitted to the front pillars. As a result, the vehicle body rigidity can further be improved.

According to the present invention, the drainage channels flowing rainwater are formed at the both ends of the dashboard upper member and, therefore, for example, rainwater running off the windshield can be drained off.

According to the present invention, the left and right side portions of the windshield are curved and extend from the front side to the rear side of the dashboard lower member and, therefore, a wider passenger compartment space can be implemented.

MODE FOR CARRYING OUT THE INVENTION

Figure 1:
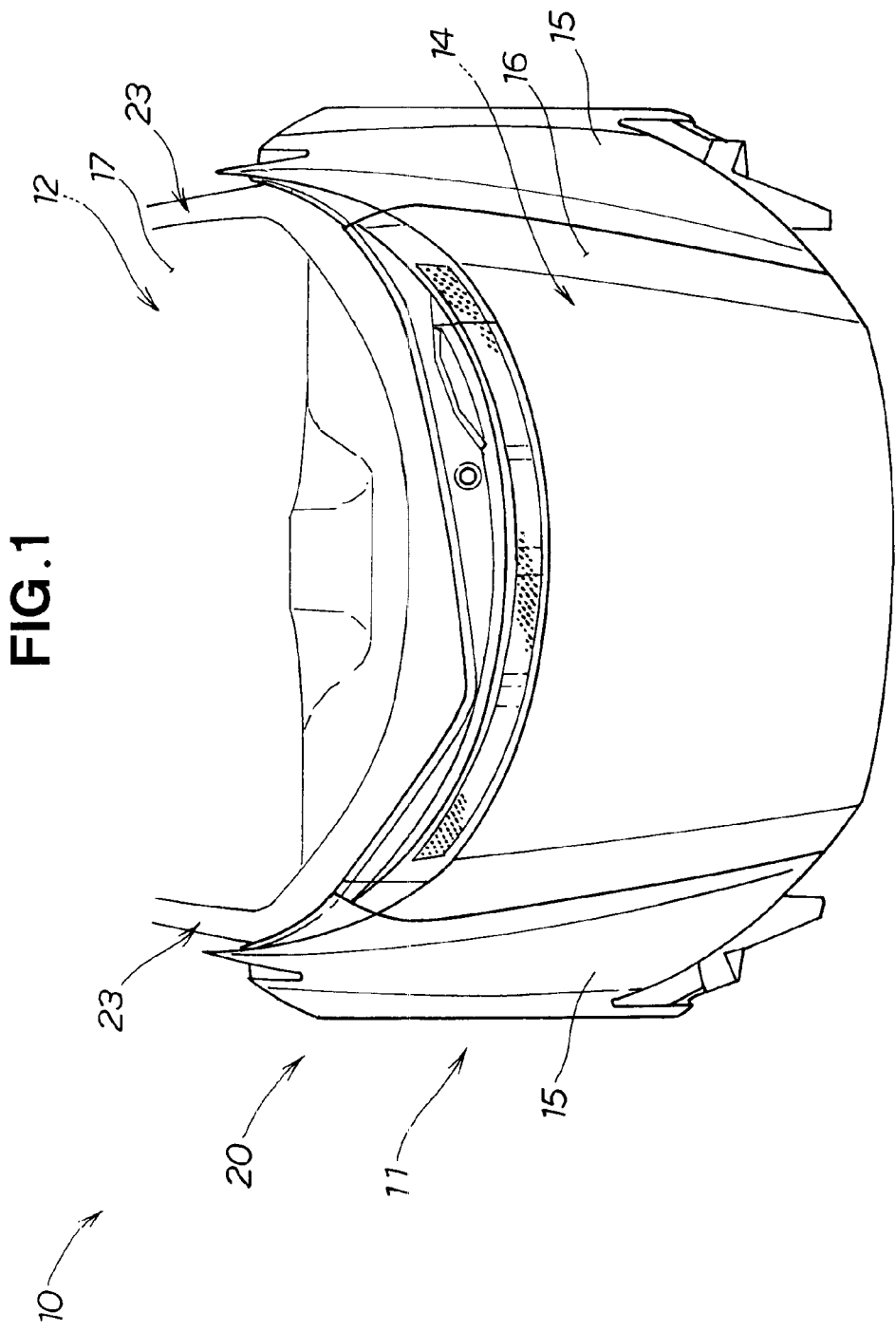
FIG. 1 is a plan view of a part of a vehicle employing a vehicle body front structure according to the present invention.
Figure 2:
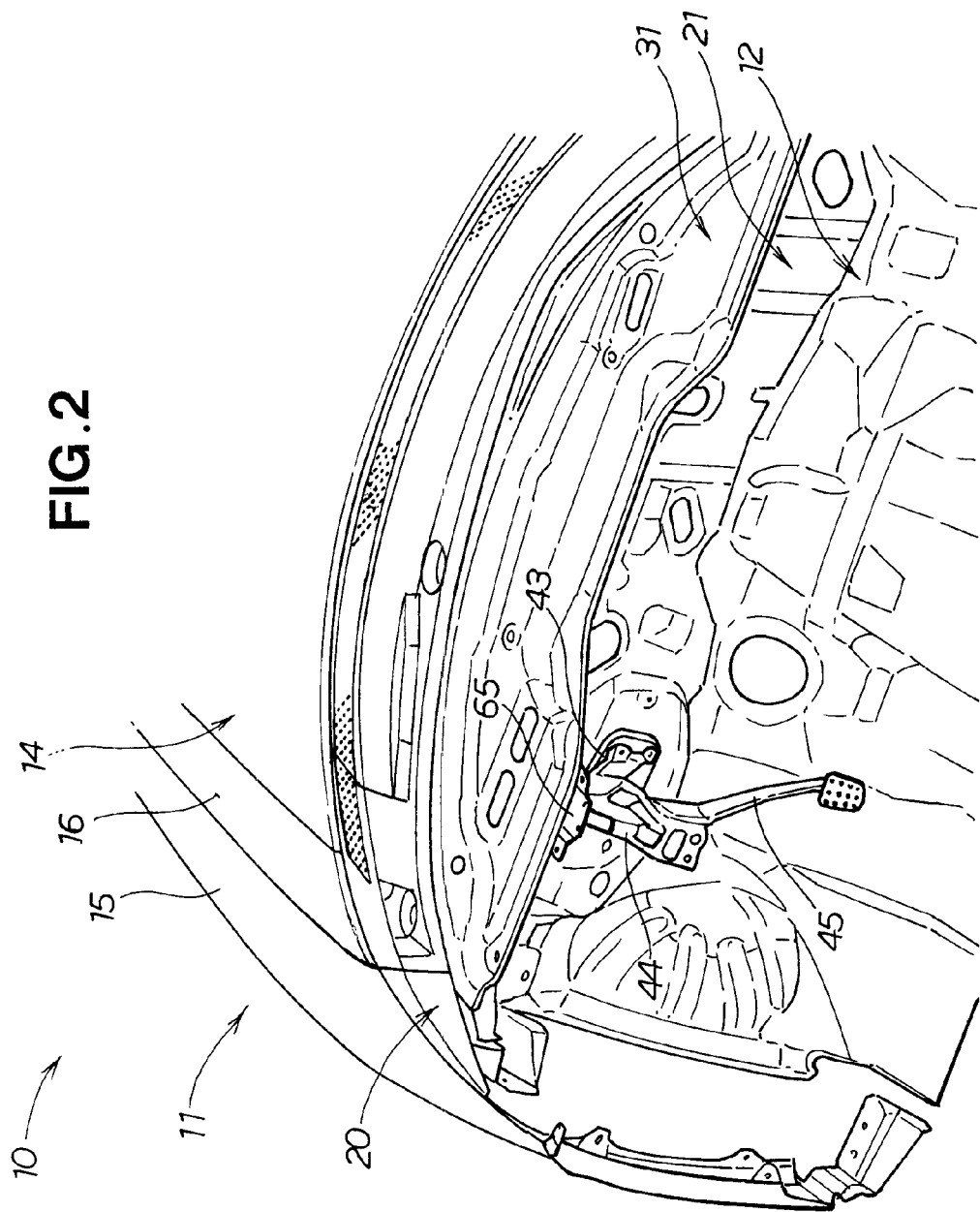
FIG. 2 is a perspective view of the vehicle body front structure as viewed from the passenger compartment of the vehicle shown in FIG. 1.
Figure 3:
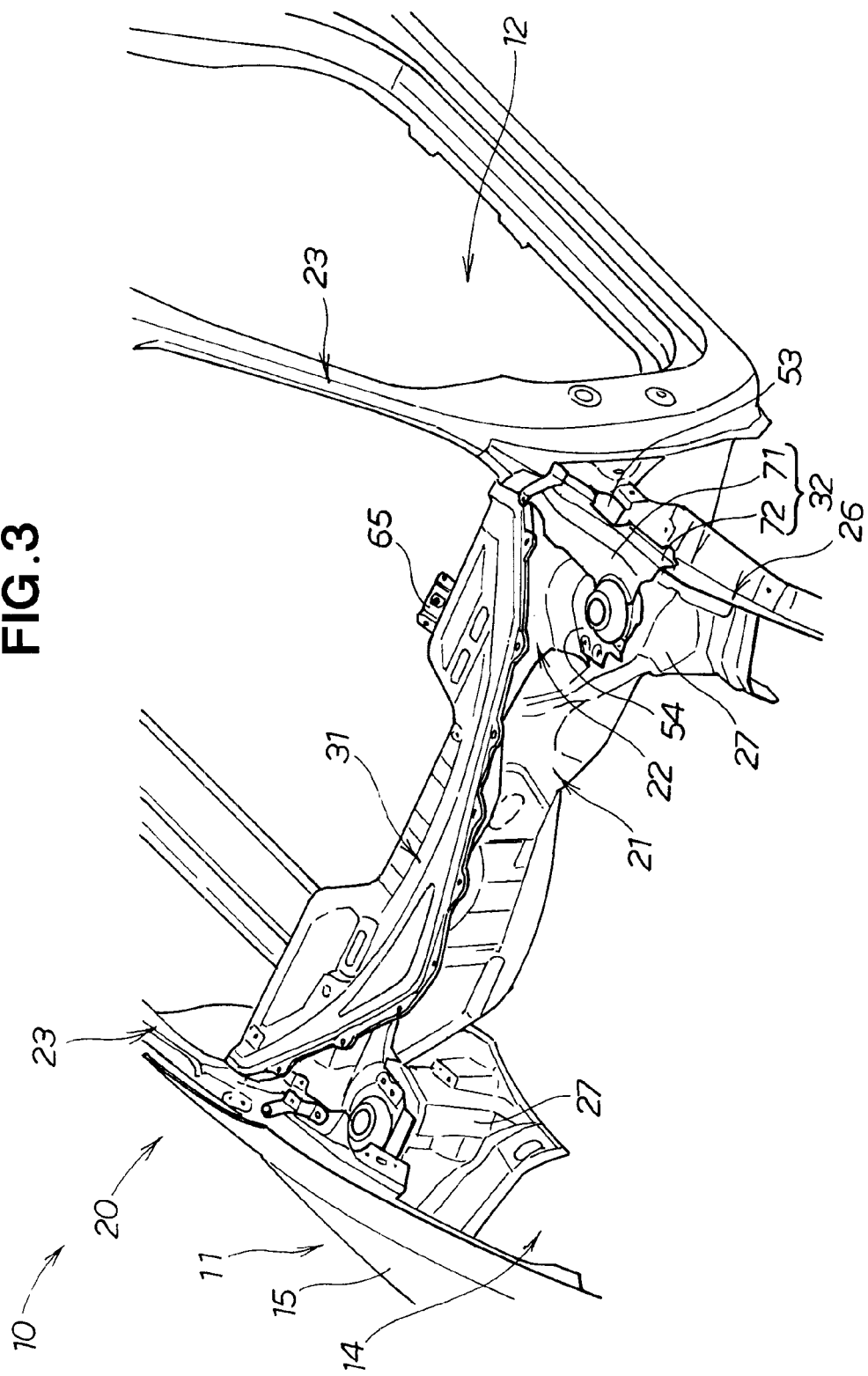
FIG. 3 is a perspective view of the vehicle body front structure as viewed from outside the vehicle.

A preferred embodiment of the present invention will now be described with reference to the accompanying drawings.
Embodiment As depicted in FIG. 1, a vehicle 10 includes a vehicle body 11, an engine compartment 14 housing an engine (not depicted) and auxiliary machines, a passenger compartment 12 accommodating passenger's seats (not depicted) etc., left and right front fenders 15, 15 covering the sides of the engine compartment 14, a hood 16 covering the upper side of the engine compartment 14, and a windshield 17 separating the passenger compartment 12 and the outside of the vehicle.

As depicted in FIGS. 2 to 6, a vehicle body front structure 20 includes a dashboard lower member 21 and a dashboard upper member 22 separating the engine compartment 14 and the passenger compartment 12. Front pillars 23, 23 are disposed at left and right ends of the dashboard lower member 21 and the dashboard upper member 22. Upper members 26, 26 (only one shown) extend forward from the front pillars 23, 23. Damper bases 27, 27 are disposed between the upper members 26, 26 and a front side frame (not shown). The windshield 17 is supported by a windshield support 31 disposed on an upper portion of the dashboard upper member 22. L-shaped cross-sectional frames 32, 32 (only one shown) extend from the upper members 26, 26 to the front pillars 23, 23.

The windshield 17 has a convex center portion projecting forward, and curved left and right side portions of the windshield 17 extending rearward from a front side of the dashboard lower member 21. The damper base 27 has an upper portion supported by the upper member 26.

The dashboard lower member 21 includes a substantially flat body portion 41 defined between left and right sides thereof. Formed on an upper end of the body portion 41 is an upper end flange 42. The dashboard lower member 21 further includes a bracket attaching portion 43 to which is attached a front portion of a brake pedal bracket 44.

The upper end flange 42 has a center coupled to a coupling portion 62 defined by the dashboard upper member 22 and the windshield support 31, and left and right side portions coupled to a bottom surface 52 of the dashboard upper member 22.

Specifically, the upper end flange 42 is spot-welded at the center to the coupling portion 62 and spot-welded on the left and right side portions to the bottom surface 52 of the dashboard upper member 22. In other words, the center of the upper end flange 42 is coupled to both a rear end flange 51 of the dashboard upper member 22 and a rear end flange 61 of the windshield support 31. The left and right side portions of the upper end flange 42 are coupled to the bottom surface 52 of the dashboard upper member 22.

The rear end flange 51 of the dashboard upper member 22 is coupled (spot-welded) to the windshield support 31 and to the center of the upper end flange 42 of the dashboard lower member 21. Coupled (spot-welded) to the bottom surface 52 of the dashboard upper member 22 is the left and right side portions of the upper end flange 42 of the dashboard lower member 21. The dashboard upper member 22 has opposing ends defining drainage channels 53, 53 (only one shown) for draining rainwater. The opposing ends of the dashboard upper member 22 has front portions defining damper base coupling portions 54, 54 coupled to the damper bases 27.

The windshield support 31 includes the rear end flange 61 coupled (spot-welded) to the rear end flange 51 of the dashboard upper member 22. The windshield support 31 has an upper surface 31a. Disposed forward of the upper surface 31a is a raised portion 67 supporting the windshield 17. The raised portion 67 is positioned at a higher level than the upper surface 31a. Extending rearward from the raised portion 67 are plural beads 68a to 68g. The plural beads 68a to 68g are located on left and right sides of the windshield support 31.

In the vehicle body front structure 20, the coupling portion 62 is defined by the rear end flange 61 of the windshield support 31 and the rear end flange 51 of the dashboard upper member 22 spot-welded to the rear end flange 61. The coupling portion 62 has left and right sides defining projecting portions 63 projecting rearward of the dashboard lower member 21. Defined forward of the coupling portion 62 is an open-fronted air passage 64 continuously extending laterally of the vehicle. The projecting portions 63 have lower surfaces 63a one of which is equipped with a stay member 65 to which is secured the brake pedal bracket 44.

The lower surfaces 63a of the projecting portions 63 occupy the same location as the bottom surface 52 of the dashboard upper member 22.

On the left and right sides of the vehicle body front structure 20, dust seal (sealer) 69 is applied to the coupling portion 62 defined by the rear end flange 61 of the windshield support 31 and the rear end flange 51 of the dashboard upper member 22 spot-welded to the rear end flange 61. At the center of the vehicle body front structure 20, the coupling portion 62 is spot-welded to the upper end flange 42 of the dashboard lower member 21 and the dust seal 69 is applied to the coupling portion 62 and the upper end flange 42. The dust seal 69 is continuously applied to the edges of the rear end flanges 51, 61 and the upper end flange 42.

The brake pedal bracket 44 is a member supporting a brake pedal 45 for treading. The brake pedal bracket 44 has a front portion attached to the bracket attaching portion 43 of the dashboard lower member 21. The brake pedal bracket 44 has a rear portion attached to the stay member 65.

The coupling portion 62 is a part where the rear end flange 51 of the dashboard upper member 22 and the rear end flange 61 of the windshield support 31 are spot-welded together. The air passage (air introduction space) 64 is defined by the dashboard upper member 22 and the windshield support 31. In other words, the dashboard upper member 22 and the windshield support 31 have the respective rear end flanges 51, 61 coupled together with the air passage 64 defined forward of the coupling portion.

The L-shaped cross-sectional frame 32 provides a hinge base function of supporting the hood 16 (FIG. 1) in such manner as to allow the hood 16 to move between an open position and a closed position as well as a dashboard upper side member function of reinforcing the front pillar 23 and the upper member 26.

The L-shaped cross-sectional frame 32 includes an upper surface connecting portion 71 interconnecting an upper surface 26a of the upper member 26 and an upper surface 23a of the front pillar 23, and an outer surface connecting portion 72 interconnecting an outer surface 26b of the upper member 26 and an outer surface 23b of the front pillar 23. The upper surface connecting portion 71, the upper surface 26a, and the upper surface 23a define a continuous flat surface. The outer surface connecting portion 72, the outer surface 26b, and the outer surface 23b define a continuous flat surface. On the side of the damper base 27, the upper surface connecting portion 71 is also coupled via the dashboard upper member 22 to the damper base 27. On the side of the front pillar 23, the outer surface connecting portion 72 is also coupled to the dashboard upper member 22.

Figure 6:
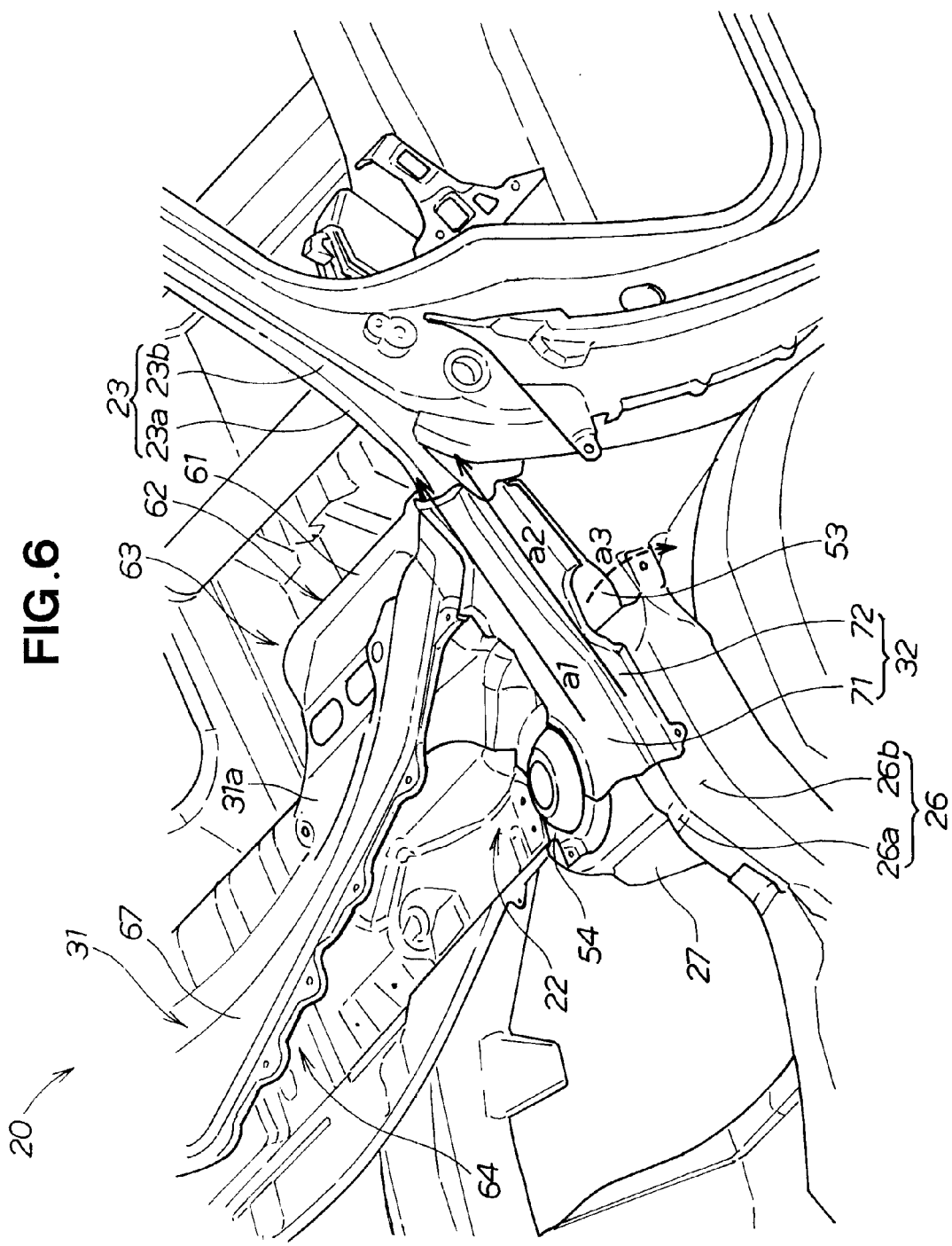
FIG. 6 is an enlarged perspective view of an L-shaped cross-sectional frame and the surroundings of the vehicle body front structure depicted in FIG. 3.

Therefore, as depicted in FIG. 6, a load can be transmitted, as indicated by an arrow a1, from the upper surface 26a of the upper member 26 to the upper surface 23a of the front pillar 23. A load can be transmitted, as indicated by an arrow a2, from the outer surface 26b of the upper member 26 to the outer surface 23b of the front pillar 23. Therefore, the vehicle body rigidity can be improved.

The drainage channel 53 for draining rainwater is defined by the dashboard upper member 22 and, therefore, rainwater which has flowed down the windshield 17 can be drained through the drainage channel 53 to the outside of the vehicle, as indicated by an arrow a3.

The vehicle body front structure 20 includes the dashboard lower member 21 and the dashboard upper member 22 which separate the engine compartment 14 and the passenger compartment 12, the front pillars 23, 23 disposed at both the left and right ends of the dashboard lower member 21 and the dashboard upper member 22, the upper members 26, 26 extending from the front pillars 23, 23 toward the front side of a vehicle body, and the windshield support 31 disposed on the upper portion of the dashboard upper member 22.

The L-shaped cross-sectional frames 32 extend from the upper members 26 to the front pillars 23. The L-shaped cross-sectional frames 32 provide flat surfaces contiguous with the upper surfaces 26a of the upper members 26 and with the upper surfaces 23a of the front pillars 23. The L-shaped cross-sectional frames 32 provide flat surfaces contiguous with the outer surfaces 26b of the upper members 26 and the outer surfaces 23b of the front pillars 23. This arrangement of the L-shaped cross-sectional frames 32 allows efficient transmission of a collision load from the upper members 26 to the front pillars 23, 23. As a result, the vehicle body rigidity can be improved.

In the vehicle body front structure 20, the dashboard upper member 22 and the windshield support 31 have the respective rear end flanges 51, 61 coupled together with the air passage 64 defined forward of the rear end flanges 51, 61 coupled together. The dashboard lower member 21 includes the upper end flange 42 having the center coupled to both of the rear end flanges 51, 61 and the left and right side portions coupled to the bottom surface 52 of the dashboard upper member 22. The dashboard lower member 21 is flat between the left and right sides. With this arrangement of the vehicle body front structure 20, the vehicle rigidity can sufficiently be ensured. For example, when the significantly curved windshield 17 is employed, the windshield can be disposed without narrowing a passenger compartment space.

The L-shaped cross-sectional frames 32 are coupled to the damper bases 27 having the upper portions supported by the dashboard upper member 22 and, therefore, for example, a load from front side frames (not depicted) supporting the damper bases 27 can also be transmitted to the front pillars 23, 23. As a result, the vehicle body rigidity can further be improved.

In the vehicle body front structure 20, the drainage channels 53, 53 for draining rainwater are defined by the opposing ends of the dashboard upper member 22 and, therefore, for example, rainwater which has flowed down the windshield 17 can be drained off.

In the vehicle body front structure 20, the windshield 17 has the curved left and right side portions extending from the front side to the rear side of the dashboard lower member 21 and, therefore, a wider passenger compartment space can be implemented.

Although the L-shaped cross-sectional frame 32 has the upper surface connecting portion 71 coupled, on the side of the damper base 27, via the dashboard upper member 22 to the damper base 27 as depicted in FIG. 6, the L-shaped cross-sectional frame 32 may be connected directly to the damper base 27.

Figure 4:
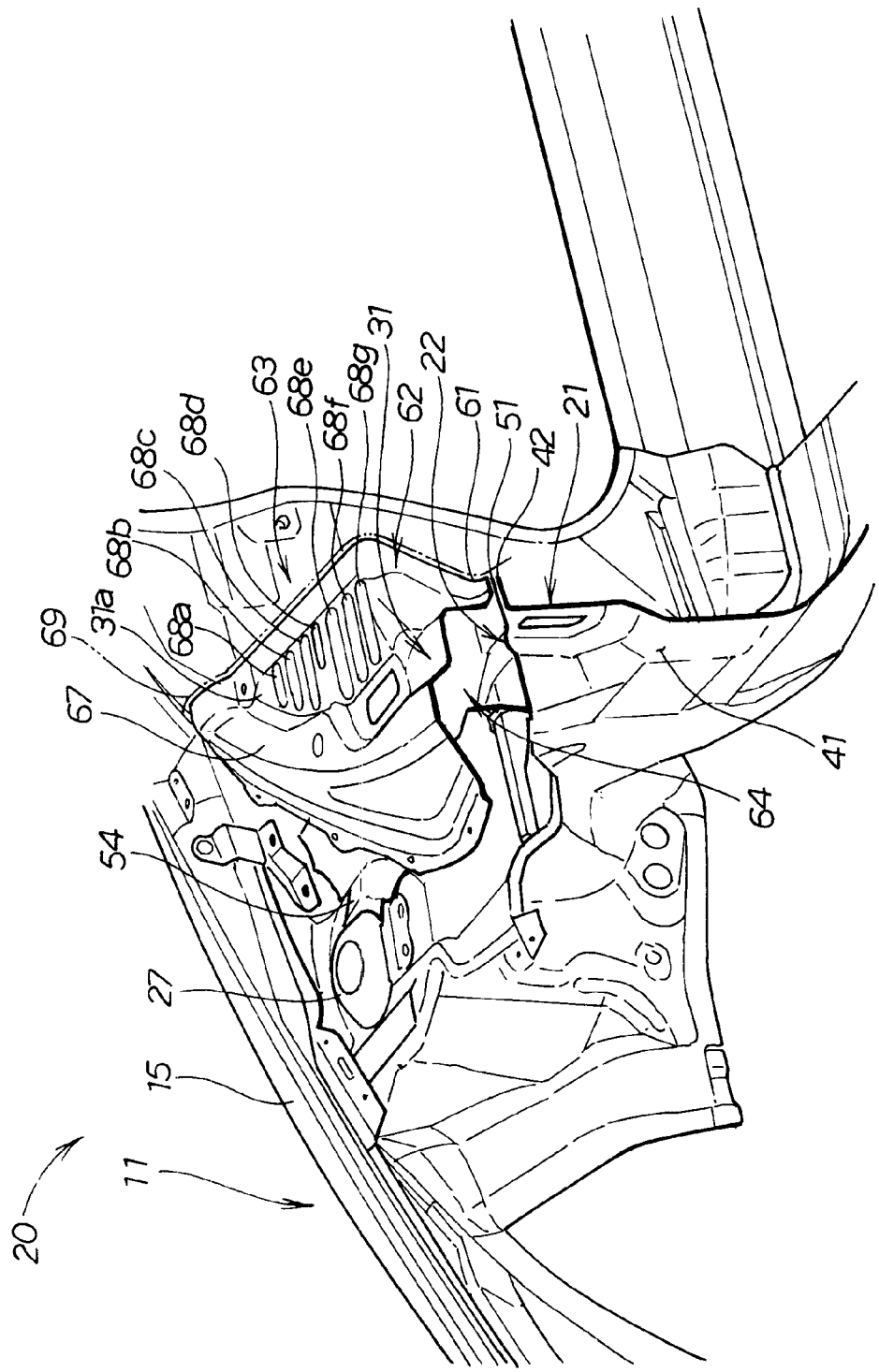
FIG. 4 is a perspective view of the vehicle body front structure depicted in FIG. 3 with portions of the structure shown in cross-section.
Figure 5:
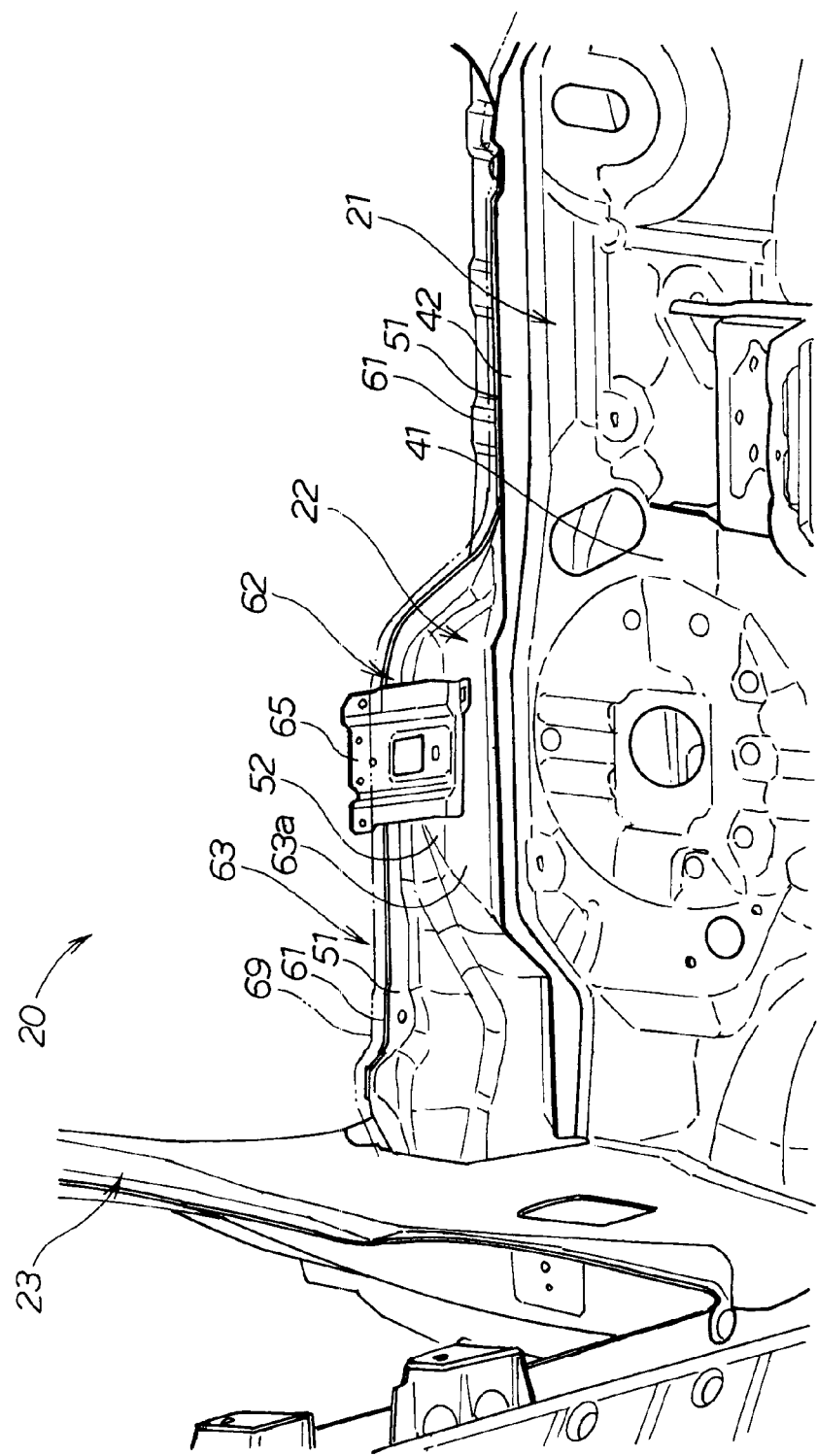
FIG. 5 is a view of the vehicle body front structure depicted in FIG. 3 as viewed from a rear lower side of the vehicle body front structure.

Although the projecting portions 63 have the beads 68a to 68g extending backward from the raised portion 67 in the longitudinal direction of the vehicle body, as depicted in FIG. 4, the beads may extend laterally of the vehicle body. Any number of beads may be formed.

Industrial Applicability

The vehicle body front structure according to the present invention is preferably employed for a vehicle with a windshield significantly curved and a leading end of a hood located at a lower level.

Reference Signs List

10 . . . vehicle; 11 . . . vehicle body; 12 . . . passenger compartment; 14 . . . engine compartment; 17 . . . windshield; 20 . . . vehicle body front structure; 21 . . . dashboard lower member; 22 . . . dashboard upper member; 23 . . . front pillar; 23a . . . upper surface; 23b . . . outer surface; 26 . . . upper member; 26a . . . upper surface; 26b . . . outer surface; 31 . . . windshield support; 32 . . . L-shaped cross-sectional frame; 42 . . . upper end flange; 51 . . . rear end flange; 52 . . . bottom surface; 53 . . . drainage channel; 61 . . . rear end flange; and 64 . . . air passage.

The invention claimed is:

1. A vehicle body front structure comprising:
a dashboard lower member and a dashboard upper member separating an engine compartment and a passenger compartment;

front pillars disposed at left and right ends of the dashboard lower member and the dashboard upper member;

upper members extending from the front pillars toward a front side of a vehicle body;

a windshield support disposed on an upper portion of the dashboard upper member; and a windshield disposed on the windshield support, wherein L-shaped cross-sectional frames extend from the upper members to the front pillars, and the upper members include upper surfaces and outer surfaces, and the front pillars include upper surfaces and outer surfaces, including upper surface connecting portions contiguous with the upper surfaces of the upper members and the upper surfaces of the front pillars, and outer surface connecting portions contiguous with the outer surfaces of the upper members and the outer surfaces of the front pillars, the upper surface connecting portions being coupled via the dashboard upper member to the damper bases on sides of the damper bases, the outer surface connecting portions being coupled to the dashboard upper member on sides of the front pillars, wherein the windshield has a convex center portion projecting forward of the vehicle body between left and right sides thereof, and the windshield is curved and extends rearward from a front side of the dashboard lower member, wherein the dashboard upper member and the windshield support have respective rear end flanges coupled together, the rear end flanges of the dashboard upper member and the windshield support define a coupling portion with an air passage defined forward of the coupling portion, the coupling portion has left and right sides defining projecting portions projecting rearward relative to the dashboard lower member, and wherein the dashboard lower member includes an upper end flange having a center coupled to the rear end flanges of the dashboard upper member and the windshield support and left and right side portions coupled to bottom surfaces of the projecting portions, and the dashboard lower member is flat between left and right sides thereof.

2. The vehicle body front structure of claim 1, wherein the dashboard upper member has opposing ends defining drainage channels for draining rainwater.

3. The vehicle body front structure of claim 1, wherein the L-shaped cross-sectional frames provide a hinge base function to support a hood in such a manner as to allow the hood to move between an open position and a closed position, and a dashboard upper side member function to reinforce the front pillars and the upper members.

* * * * *